United States Patent
Cao et al.

(10) Patent No.: US 11,381,877 B2
(45) Date of Patent: Jul. 5, 2022

(54) METHOD FOR PROCESSING HYBRID PLAYING OF MULTI-TYPE MULTIMEDIA DATA, PLAYING APPARATUS AND STORAGE MEDIUM

(71) Applicant: BEIJING XIAOMI MOBILE SOFTWARE CO., LTD., Beijing (CN)

(72) Inventors: Zhe Cao, Beijing (CN); Shanping Wu, Beijing (CN); Shiqian Tang, Beijing (CN); Haihua Wang, Beijing (CN); Yifei Luo, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 0 days.

(21) Appl. No.: 17/241,624

(22) Filed: Apr. 27, 2021

(65) Prior Publication Data
US 2022/0038779 A1 Feb. 3, 2022

(30) Foreign Application Priority Data

Jul. 31, 2020 (CN) .......................... 202010762931.0

(51) Int. Cl.
*H04N 21/462* (2011.01)
*H04N 21/4782* (2011.01)

(52) U.S. Cl.
CPC ..... *H04N 21/4622* (2013.01); *H04N 21/4782* (2013.01)

(58) Field of Classification Search
CPC ........... H04N 21/4622; H04N 21/4782; H04N 21/4433; H04N 21/47202; H04N 21/6125; H04N 21/6112; H04N 21/482
See application file for complete search history.

(56) References Cited

U.S. PATENT DOCUMENTS

| 11,178,455 B1* | 11/2021 | Lee ................... H04N 21/43635 |
| 2012/0174170 A1* | 7/2012 | Dewa ............... H04N 21/44016 |
| | | 725/93 |
| 2013/0111530 A1* | 5/2013 | Kitazato ............ H04N 21/4627 |
| | | 725/93 |

(Continued)

FOREIGN PATENT DOCUMENTS

| CN | 103327267 A | 9/2013 |
| CN | 107707969 A | 2/2018 |

(Continued)

OTHER PUBLICATIONS

DVB Organization "HbbTV 2.0.2 specification" Feb. 16, 2018, 313 pages.

(Continued)

*Primary Examiner* — John R Schnurr
(74) *Attorney, Agent, or Firm* — Lathrop GPM LLP

(57) ABSTRACT

A method for processing hybrid playing of multi-type multimedia includes: receiving a return instruction; determining whether a current address is a homepage address of the playing apparatus; when the current address is the homepage address, obtaining state switching information of a broadcast TV video and a video on demand (Vod) played by the playing apparatus; determining whether the obtained state switching information meets a preset condition; and when the state switching information meets the preset condition, cleaning up residual data of playing the Vod.

15 Claims, 4 Drawing Sheets

(56) References Cited

U.S. PATENT DOCUMENTS

| | | | | |
|---|---|---|---|---|
| 2013/0318562 | A1* | 11/2013 | Lv | H04N 21/482 |
| | | | | 725/110 |
| 2015/0237398 | A1* | 8/2015 | Wang | H04N 21/6125 |
| | | | | 725/110 |
| 2018/0342225 | A1* | 11/2018 | Yun | G06F 3/167 |
| 2020/0099964 | A1* | 3/2020 | Deprez | H04N 21/4348 |
| 2021/0014572 | A1* | 1/2021 | Lee | H04N 21/234 |
| 2022/0005473 | A1* | 1/2022 | Kim | H04N 21/482 |
| 2022/0021935 | A1* | 1/2022 | Jang | G06F 3/14 |

FOREIGN PATENT DOCUMENTS

| | | | | | |
|---|---|---|---|---|---|
| EP | 2434755 | A1 * | 3/2012 | | H04N 21/2143 |
| EP | 3681163 | A1 * | 7/2020 | | G06F 3/0482 |

OTHER PUBLICATIONS

Chinese Patent Application No. 202010762931.0, Office Action dated Sep. 8, 2021, 4 pages.
Chinese Patent Application No. 202010762931.0, English translation of Office Action dated Sep. 8, 2021, 6 pages.
European Patent Application No. 21171447.2 Search and Opinion dated Oct. 8, 2021, 5 pages.

* cited by examiner

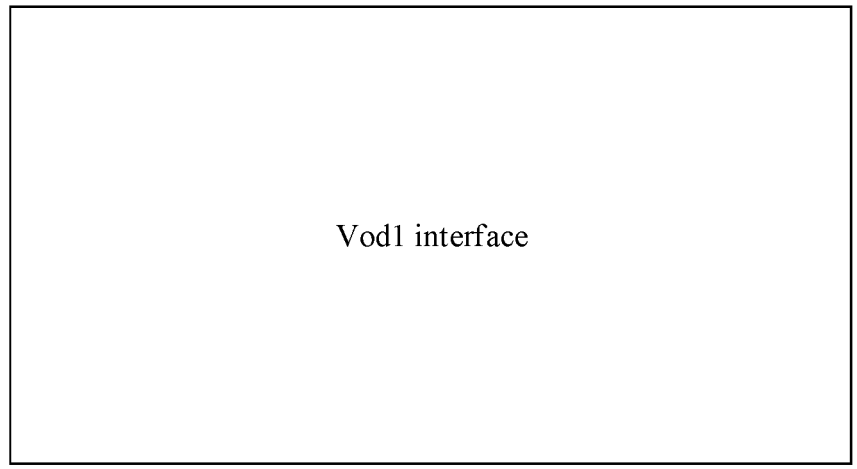
Fig. 4c
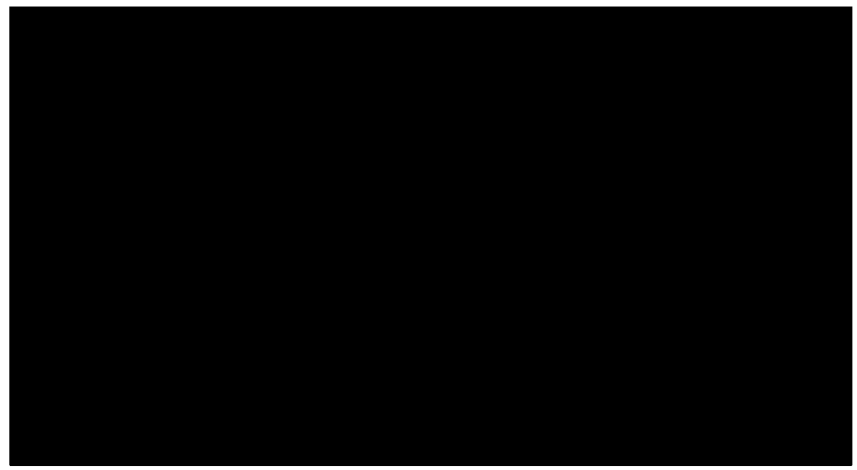
Fig. 4d
| receiving a trigger message of an Exit key or a Back key on a controller of the HbbTV | ─ S111 |
Fig. 5
| calling an engine of a browser playing the Vod to clean up a residual HTML page | ─ S151 |
Fig. 6

METHOD FOR PROCESSING HYBRID PLAYING OF MULTI-TYPE MULTIMEDIA DATA, PLAYING APPARATUS AND STORAGE MEDIUM

CROSS-REFERENCE TO RELATED APPLICATION

This application is based upon and claims priority to and benefits of Chinese Patent Application Serial No. 202010762931.0, filed the State Intellectual Property Office of P. R. China on Jul. 31, 2020, the entire content of which is incorporated herein by reference.

TECHNICAL FIELD

The present disclosure relates to a field of computer processing, and particularly to a method for processing hybrid playing of multi-type multimedia data, a playing apparatus and a storage medium.

BACKGROUND

In related art, hybrid playing of multi-type multimedia is a common playing service. For example, an HbbTV (Hybrid broadcast broadband TV) realizes mixed playing of a broadcast TV and a network video. When switching between hybrid playing of multi-type multimedia, especially when returning to playing of a broadcast TV video, data of a video on demand (Vod) are not cleaned up completely and may result in a problem that the residual data of the Vod affect playing of the broadcast TV video when returning to continue playing the broadcast TV video. Issues relating to how to ensure that the residual data of the Vod do not affect subsequent playing and when to clean up the residual data remain unsolved in the field.

SUMMARY

According to embodiments of the present disclosure, a method for processing hybrid playing of multi-type multimedia data is provided. The method is applied to a playing apparatus. The playing apparatus is capable to play a broadcast TV video and a video on demand (Vod). The method includes: receiving a return instruction; determining whether a current address is a homepage address of the playing apparatus; in response to the current address being the homepage address, obtaining state switching information of the broadcast TV video and the Vod played by the playing apparatus; determining whether the obtained state switching information meets a preset condition; and in response to the state switching information meeting the preset condition, cleaning up residual data of playing the Vod.

According to the embodiment of the present disclosure, a playing apparatus for hybrid playing of multi-type multimedia data is provided, and the playing apparatus includes: a processor; a memory configured to store instructions executable by the processor. The processor is configured to: receive a return instruction; determine whether a current address is a homepage address of the playing apparatus; in response to the current address being the homepage address, obtain state switching information of a broadcast TV video and a video on demand (Vod) played by the playing apparatus; determine whether the obtained state switching information meets a preset condition; and clean up the residual data of the Vod in response to the state switching information meeting the preset condition.

According to embodiment of the present disclosure, a non-transitory computer readable storage medium is provided. When instructions in the storage medium is executed by a processor of a playing apparatus, the playing apparatus is caused to perform a method for processing hybrid playing of multi-type multimedia data. The method includes: receiving a return instruction; determining whether a current address is a homepage address of the playing apparatus; in response to the current address being the homepage address, obtaining state switching information of a broadcast TV video and a video on demand (Vod) played by the playing apparatus; determining whether the obtained state switching information meets a preset condition; and in response to the state switching information meeting the preset condition, cleaning up residual data of playing the Vod.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

FIG. 4c illustrates a playing interface of an HBBTV playing apparatus playing a video on demand Vod1;

FIG. 4d illustrates a playing interface of an HBBTV playing apparatus having a black screen;

FIG. 5 is a flowchart illustrating a method for receiving a return instruction at block S11 of FIG. 1;

FIG. 6 is a flowchart illustrating a method for cleaning up residual data of playing a video on demand at block S15 of FIG. 1;

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
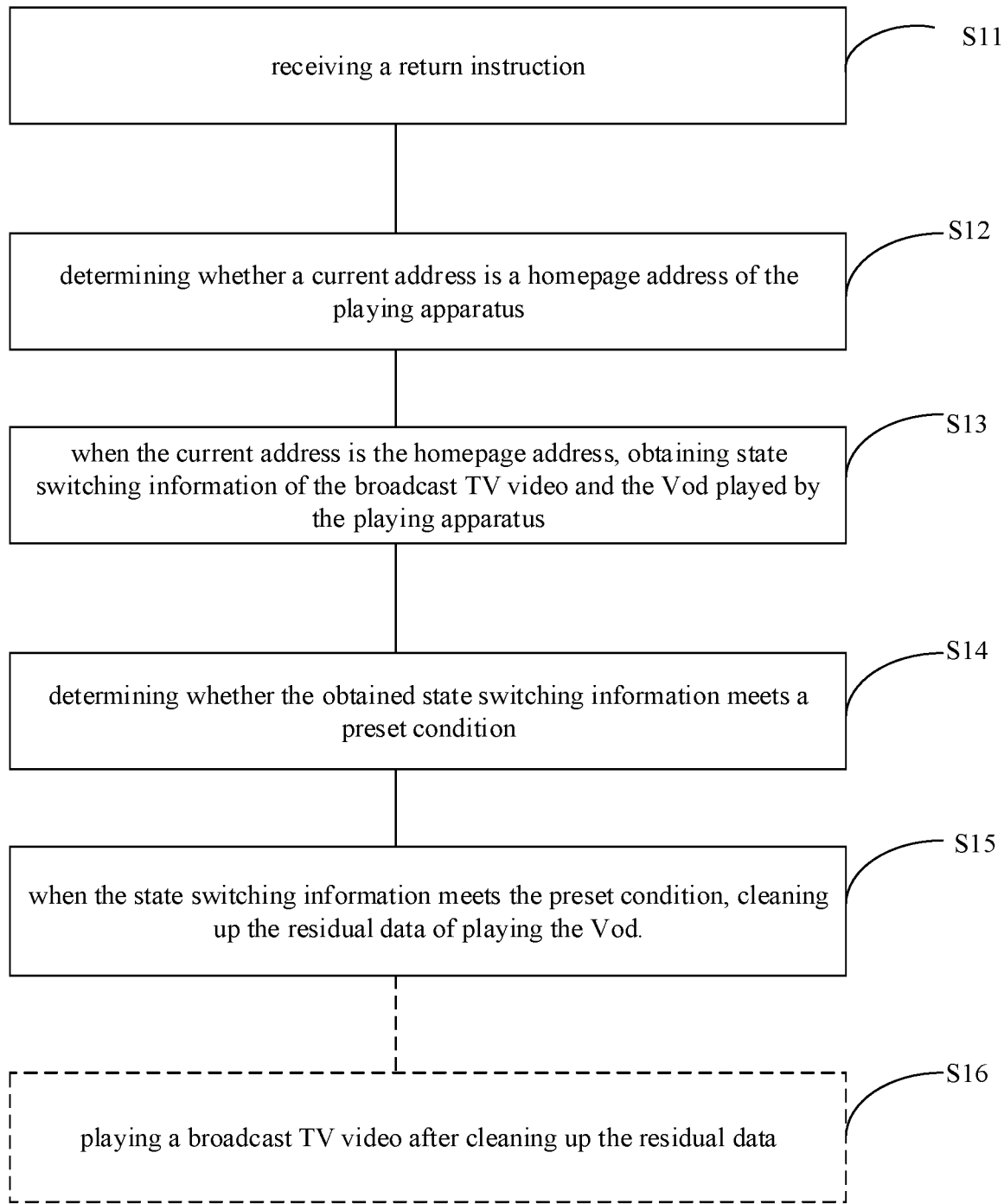
FIG. 1 is a flowchart illustrating a method for processing hybrid playing of multi-type multimedia data according to an example embodiment.

The embodiments of the present disclosure provide a method for processing hybrid playing of multi-type multimedia data. The method for processing hybrid playing of multi-type multimedia data is applied to a playing apparatus. The playing apparatus is capable to play a broadcast TV video and a video on demand (Vod). FIG. 1 is a flowchart illustrating a method for processing hybrid playing of multi-type multimedia data according to an example embodiment:

At block S11, a return instruction is received.

At block S12, it is determined whether a current address is a homepage address of the playing apparatus.

At block S13, when the current address is the homepage address, obtaining state switching information of the broadcast TV video and the Vod played.

At block S14, it is determined whether the obtained state switching information meets a preset condition.

At block S15, when the state switching information meets the preset condition, the residual data of playing the Vod is cleaned up.

To solve the defects in the related art, in the method for processing hybrid playing of multi-type multimedia data, the return instruction is received, it is determined whether the current address is the homepage address of the playing apparatus, when the current address is the homepage address, the state switching information of the broadcast TV video and the network on-demand vide played by the playing apparatus is obtained, it is determined whether the obtained state switching information meets the preset condition, when the state switching information meets the preset condition, the residual data of playing the Vod is cleaned up. The return instruction may be an instruction that may instruct the playing apparatus to return to the homepage address. For example, the return instruction may be a trigger message on a BACK key or an Exit key set on a controller.

With the method for processing hybrid playing of multi-type multimedia data provided by the present disclosure, when the return instruction is received, it is determined whether the residual data of playing the Vod need to be cleaned up by determining whether the current address is the homepage address of the playing apparatus and whether the state switching information of the broadcast TV video and the Vod meets the preset condition, so as to clean up the residual data of playing the Vod and to effectively ensure that the residual data of playing the Vod is cleaned up in time without affecting subsequent playing.

Figure 2:
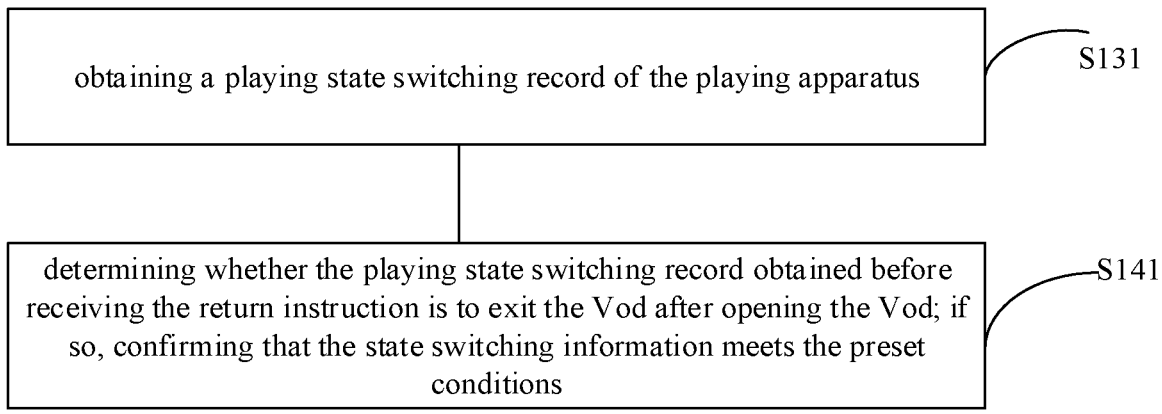
FIG. 2 is a flowchart illustrating a method for obtaining state switching information of playing a broadcast TV video and a video on demand (Vod) at block S13 of FIG. 1.

An exemplary embodiment of the present disclosure provides a method for processing hybrid playing of multi-type multimedia data. As shown in FIG. 2, FIG. 2 is a flowchart illustrating a method for obtaining the state switching information of playing the broadcast TV video and the Vod at block S13 of FIG. 1.

At block S131, a playing state switching record of the playing apparatus is obtained.

Determining whether the obtained state switching information meets the preset condition at block S14 includes following.

At block S141, it is determined whether the playing state switching record obtained before receiving the return instruction is to exit the Vod after opening the Vod. When the playing state switching record obtained before receiving the return instruction is to exit the Vod after opening the Vod, it is confirmed the state switching information meets the preset condition.

In the present disclosure, in order to determine the time to clean up the residual data of the Vod, the playing state switching record of the playing apparatus is obtained. The playing state switching record records a switching record when the playing apparatus switche between different types of video playing data each time for playing switching. Taking a hybrid broadcast broadband TV (HbbTV) as an example, when turning on the HbbTV, the HbbTV starts a broadcast TV (also called a digital TV) to play a broadcast TV video. The playing state switching record of the playing apparatus playing the broadcast TV video and the Vod is recorded as DTV Start. When a prompt message of a Vod is received in a process of watching a DTV video, skipping to play a Vod is selected. At this time, the playing state switching record is: DTV start→DTV stop→Vod Start. When the Vod completes playing or a user actively terminates the playing and returns to a DTV to continue to play a DTV video, the playing state switching record is: DTV Start →DTV Stop →Vod Start →Vod Stop →DTV Start, indicating that it's necessary to return to the DTV video to continue to play and there may be the residual data of the Vod. When the playing apparatus receives the return instruction, it is determined whether the current address is the homepage address of the playing apparatus. If yes, the state switching information of the DTV video and the Vod played by the playing apparatus is obtained, that is a playing state switching record is obtained. When it is determined the playing state switching record obtained before receiving the return instruction is to exit the Vod after opening the Vod, the state switching information meets the preset condition, and the residual data of playing the Vod is cleaned up.

Figure 3:
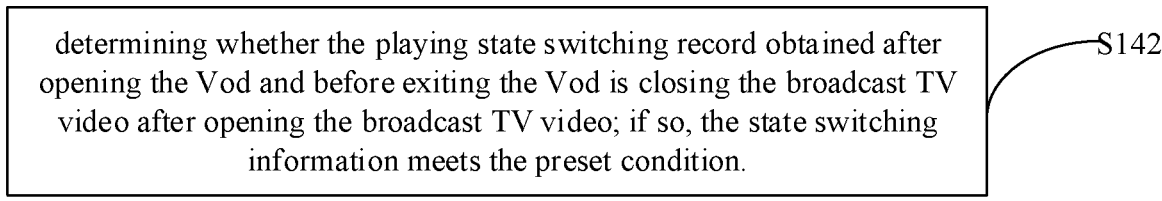
FIG. 3 is a flowchart illustrating a method for determining whether the obtained state switching information meets a preset condition at block S14 of FIG. 1.

An exemplary embodiment of the present disclosure provides a method for processing hybrid playing of multi-type multimedia data. As shown in FIG. 3, FIG. 3 is a flowchart illustrating a method for determining whether the obtained state switching information meets the preset condition at block S14 of FIG. 1.

At block S142, it is determined whether the playing state switching record, obtained after opening the Vod and before exiting the Vod is closing the broadcast TV video after opening the broadcast TV video. If yes, the state switching information meets the preset condition.

In the present disclosure, in order to further confirm that the residual data of the Vod needs to be cleaned up, it is determined whether the playing state switching record, obtained after the Vod is opened and before exiting the Vod, is "closing the broadcast TV video after opening the broadcast TV video". If so, the residual data of the Vod is cleaned up. Taking the HbbTV for an example, when the Vod completes playing or a user terminates playing the Vod, and when the playing apparatus receives a return instruction, it is determined whether the state switching information, obtained after opening the Vod and before exiting the Vod, is closing the broadcast TV video after opening the broadcast TV video. If so, the state switching information meets the preset condition, and the residual data of the Vod is cleaned up.

An exemplary embodiment of the present disclosure provides a method for processing hybrid playing of multi-type multimedia. The method provided in the present disclosure further includes following.

At block S16, a broadcast TV video is played after the residual data is cleaned up.

As shown in FIG. 1, at block S16 as shown in a dashed box of FIG. 1, the broadcast TV video is played after the residual data is cleaned up. Taking an HbbTV for an example, when the Vod completes playing or the user terminates playing the Vod and when returning to continue to play the broadcast DTV video, it is determined whether the current address is the homepage address of the playing apparatus. If yes, the state switching information of the broadcast TV video and the Vod played by the playing apparatus is obtained. It is determined whether the obtained state switching information meets the preset condition. If yes, the residual data of playing the Vod is cleaned up. The broadcast TV video is played after cleaning up the residual data is finished.

An exemplary embodiment of the present disclosure provides a method for processing hybrid playing of multi-type multimedia data, which is applied to an HbbTV, that is, the playing apparatus is the HbbTV.

When the HbbTV playing apparatus plays the broadcast TV, a prompt message of a Vod is received, skipping to the Vod for playing may be selected. Since interaction information display of the HBBTV is to implement system function calls based on hypertext markup language (HTML) page display and JavaScript scripts, the browser engine performs rendering and running.

Since JavaScript scripts are provided by a third party application developer, some application development does not comply with HbbTV specifications, and the management and control of the life cycle of HbbTV applications is inaccurate, which leads to using problems. For example, when the user starts an HbbTV application page, the user clicks on a VOD playing finish key or actively stops the playing, a selection page is entered. When a BACK key is clicked to exit the HbbTV application page. A JavaScript script of the application page does not perform a thorough page deletion action, and there is residual data, which causes that the TV has sound but with a black screen, that is, a black screen with sound, when returning to a channel of the broadcast TV video for further playing. In order to avoid black screen, it may be determined when to clean up the residual data. In the method provided by the present disclosure, when the return instruction is received, the state switching information of the playing apparatus is obtained, and the residual data of the Vod is cleaned up when the state switching information meets the preset condition.

Figure 4A:
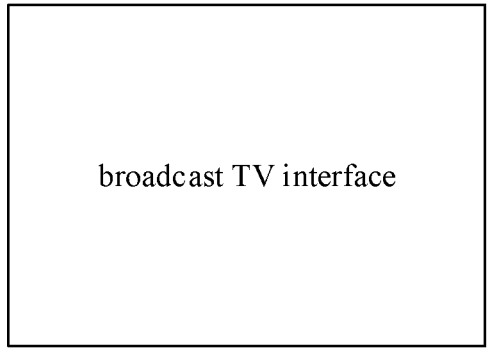
FIG. 4a illustrates a playing interface that an HBBTV playing apparatus starts playing to enter a broadcast TV for the first time.
Figure 4B:
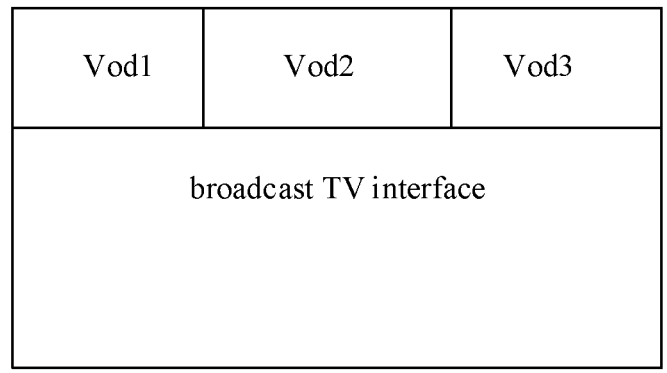
FIG. 4b illustrates a selection interface of an HBBTV playing apparatus.

When the HbbTV playing apparatus plays the broadcast TV video, as shown in FIG. 4a, FIG. 4a illustrates a playing interface that an HBBTV playing apparatus plays the broadcast TV video. When a prompt message of Vod information, the prompt message is clicked, and a selection interface. As shown in FIG. 4b, FIG. 4b illustrates a selection interface of an HBBTV playing apparatus, and a user may select to watch a Vod that he wants to watch, for example, a Vod1. Entering the selection interface may also be performed in other operating modes, for example, entering the selection interface through a corresponding button of a controller of the HBBTV playing apparatus. When the user selects the Vod1 and enters a playing interface of the Vod1, as shown in FIG. 4c, FIG. 4c illustrates a playing screen of an HBBTV playing apparatus playing the Vod 1. After the Vod 1 completes playing or the user actively terminates playing, the selection interface shown in FIG. 4b is entered. The user may further select to watch a Vod or select to return to the broadcast TV to continue playing. For example, the user may click a BACK key or an Exit key to return to the broadcast TV for further playing the broadcast TV video. When the user selects to return to the broadcast TV for further playing, in the related art, since there is residual data due to the above reasons, a black screen may appear, having sound but no picture. As shown in FIG. 4d, FIG. 4d illustrates a playing interface of an HbbTV playing apparatus having a black screen. Other operations such as reboot and channel switching may be used to exit a black screen state, and a normal playing of the broadcast TV is entered. When the processing method in the present disclosure is adopted, a black screen may no longer appear and the current video playing interface of the broadcast TV may be directly entered.

An exemplary embodiment of the present disclosure provides a method for processing hybrid playing of multi-type multimedia data. When the playing apparatus is an HbbTV, as shown in FIG. 5, FIG. 5 is a flowchart illustrating a method for receiving the return instruction at block S111 of FIG. 1.

At block S111, a trigger message of an Exit key or a Back key on a controller of the HbbTV is received.

When the playing apparatus is the HbbTV in the present disclosure, the Exit key or the Back key is set on the controller of the TV, and their function is to return to the broadcast TV from the playing state of the currently played Vod for further playing. When the trigger message from the Exit key or the Back key is received, it indicates that it may return to playing of the broadcast TV from the state of playing the Vod.

An exemplary embodiment of the present disclosure provides a method for processing hybrid playing of multi-type multimedia data. When the playing apparatus is an HbbTV, as shown in FIG. 6, FIG. 6 is a flowchart illustrating a method for cleaning up the residual data of playing the Vod at block S15 of FIG. 1.

At block S151, an engine of a browser playing the Vod is called to clean up a residual HTML page.

As described above, interaction information display of the HbbTV is to achieve system function calls based on HTML page display and JavaScript scripts, and to render and run by an engine of a browser. When the user starts an HbbTV application page, clicks on a VOD playing finish key to or actively stop the playing, and clicks on a BACK key to exit the HbbTV application page, the residual data is an HTML page. In order to avoid black screen due to the residual HTML page, the residual HTML page is cleaned up.

With the method for processing hybrid playing of multi-type multimedia data provided by the present disclosure, by obtaining the state switching information, such as the playing state switching record, of playing the broadcast TV video and the Vod of the playing apparatus, the state switching information in combination with the return instruction is used to determine whether it is necessary to clean up the residual data of multimedia data of the Vod, so as to effectively ensure the residual data of playing the Vod is cleaned up in time without affecting subsequent playing.

Figure 7:
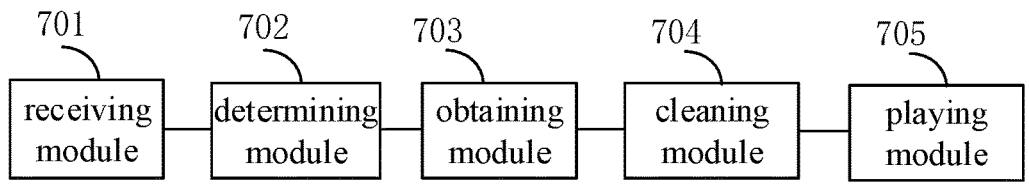
FIG. 7 is a block diagram illustrating a playing apparatus for hybrid playing of multi-type multimedia data according to an example embodiment.

An exemplary embodiment of the present disclosure provides a playing apparatus for hybrid playing of multi-type multimedia data. As shown in FIG. 7, FIG. 7 is a block diagram illustrating a playing apparatus for hybrid playing of multi-type multimedia data according to an exemplary embodiment. The playing apparatus for hybrid playing of multi-type multimedia data includes a receiving module 701, a determining module 702, an obtaining module 703, and a cleaning module 704.

The receiving module 701 is configured to receive a return instruction.

The determining module 702 is configured to determine whether a current address is a homepage address of the playing apparatus.

The obtaining module 703 is configured to, obtain state switching information of the broadcast TV video and the Vod played by the playing apparatus when the current address is the homepage address.

The determining module is further configured to determine whether the obtained state switching information meets a preset condition.

The cleaning module 704 is configured to clean up the residual data of the Vod in response to the state switching information meeting the preset condition.

The obtaining module 703 is configured to obtain a playing state switching record of the playing apparatus.

The determining module 702 is configured to determine whether the playing state switching record obtained before receiving the return instruction is exiting the Vodafter opening the Vod, and determine that the state switching information meets the preset condition when the playing state switching record obtained before receiving the return instruction is exiting the Vod after opening the Vod.

The determining module 702 is further configured to determine whether the playing state switching record, obtained after opening the Vod and before exiting the Vod, is closing the broadcast TV video after opening the broadcast TV video, and determine that the state switching information meets the preset condition when the playing state switching record, obtained after opening the Vod and before exiting the Vod, is closing the broadcast TV video after opening the broadcast TV video.

The playing apparatus further includes: a playing module 705, configured to play the broadcast TV video after cleaning up the residual data.

In an embodiment, the playing apparatus is an HbbTV (Hybrid broadcast broadband TV), and the receiving module is further configured to receive a trigger message of an Exit key or a Back key on a controller of the HbbTVreceive a trigger message of an Exit or Back key on the controller of the HbbTV.

The cleaning module 704 is configured to call an engine of a browser playing a Vod to clean up the residual HTML page.

With regard to the apparatus in the above embodiments, the specific way in which each module performs the operation has been described in detail in the embodiments of the method and will not be elaborated here.

Figure 8:
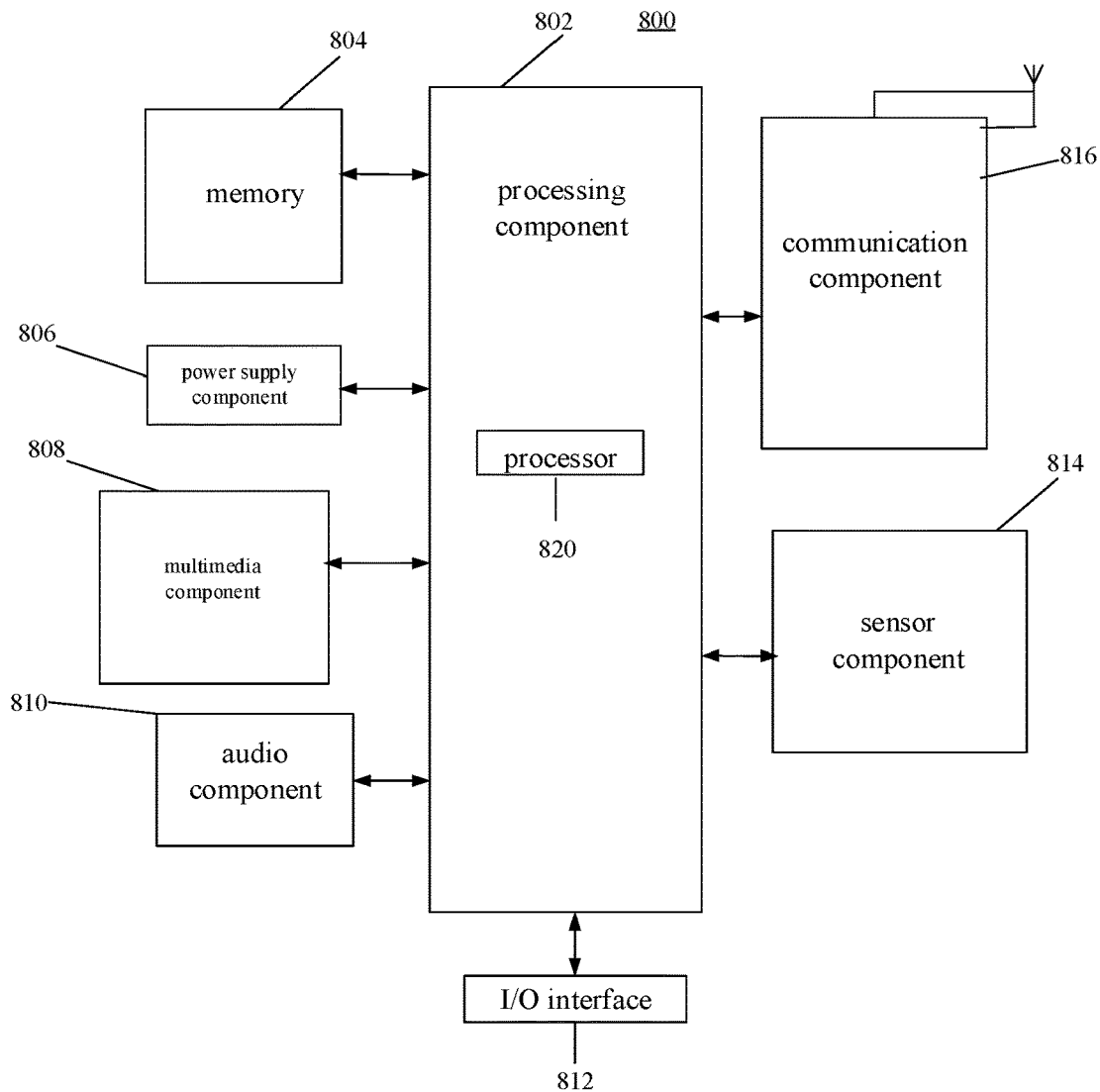
FIG. 8 is a schematic diagram illustrating a playing apparatus for hybrid playing of multi-type multimedia data according to an example embodiment.

FIG. 8 is a block diagram illustrating a playing apparatus 800 for hybrid playing of multi-type multimedia data according to an exemplary embodiment. For example, the apparatus 800 may be a mobile phone, a computer, a digital broadcasting terminal, a messaging device, a game console, a tablet device, a medical device, exercise equipment, a personal digital assistant, etc.

Referring to FIG. 8, the apparatus 800 may include one or more of the following components: a processing component 802, a memory 804, a power component 806, a multimedia component 808, an audio component 810, an input/output (I/O) interface 812, a sensor component 814, and a communication component 816.

The processing component 802 generally controls the overall operations of the apparatus 800, such as the operations related to display, phone calls, data communications, camera operations and recording operations. The processing component 802 may include one or more processors 820 to perform instructions, to complete all or part of the steps in the above described methods. In addition, the processing component 802 may include one or more modules for the convenience of interaction between the processing component 802 and other components. For example, the processing component 802 may include a multimedia module for the convenience of interaction between the multimedia component 808 and the processing component 802.

The memory 804 is configured to store various types of data to support the operation of the apparatus 800. Examples of the data include instructions for any applications or methods operated on apparatus 800, contact data, phone book data, messages, pictures, videos, etc. The memory 804 may be implemented using any type of volatile or non-volatile memory devices or their combination, such as a static random access memory (SRAM), an electrically erasable programmable read-only memory (EEPROM), an erasable programmable read-only memory (EPROM), Programmable Read-Only Memory a programmable read-only memory (PROM), a read-only memory (ROM), a magnetic memory, a flash memory, a magnetic or optical disk.

The power component 806 may provide power to various components of the apparatus 800. The power component 806 may include a power management system, one or more power sources, and any other components related to the generation, management, and distribution of power for the apparatus 800.

The multimedia component 808 includes a screen providing an output interface between the apparatus 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes and gestures on the touch panel. The touch sensor may not only sense a boundary of a touch or swipe action, but also detect the duration and a pressure related to the touch or swipe action. In some embodiments, the multimedia component 808 includes a front camera and/or a rear camera. When the apparatus 800 is in operation mode, such as a photographing mode or a video mode, the front camera and/or the rear camera may receive an external multimedia data. Each of the front camera and the rear camera may be a fixed optical lens system or have focus and optical zoom capability.

The audio component 810 is configured to output and/or input audio signals. For example, the audio component 810 includes a microphone (MIC). When the apparatus 800 is in operation mode, such as call mode, a record mode, and a speech recognition mode, the microphone is configured to receive an external audio signal. The audio signals received may be further stored in the memory 804 or sent via the communication component 816. In some embodiments, the audio component 810 further includes a speaker configured to output audio signals.

The I/O interface 812 provides an interface between the processing component 802 and the peripheral interface modules, such as a keyboard, a click wheel, a button, etc. The buttons may include but are not limited to a home button, a volume button, a start button and a lock button.

The sensor component 814 includes one or more sensors, configured to provide status assessments of various aspects of the apparatus 800. For example, the sensor component 814 may detect the on/off state of the apparatus 800 and elative positioning of the components, e.g., the display and the keypad of the apparatus 800. The sensor component 814 may further detect a location change of the apparatus 800 or a component of the apparatus 800, a presence or absence of contact between the user and the apparatus 800, an orientation or an acceleration/deceleration of the apparatus 800, and a temperature change of the apparatus 800. The sensor component 814 may include a proximity sensor, which is configured to detect the existence of the objects nearby without any physical contact. The sensor component 814 may further include a light sensor, such as a CMOS or CCD image sensor, which is configured to use in imaging applications. In some embodiments, the sensor component 814 may further include an acceleration transducer, a gyroscope sensor, a magnetic sensor, a pressure sensor or a temperature sensor.

The communication component 816 is configured for the convenience of wired or wireless communication between the apparatus 800 and other devices. The apparatus 800 may access wireless networks based on a communication standard, such as Wi-Fi, 2G, 3G, 4G, 5G, or their combinations. In an exemplary embodiment, the communication component 816 receives broadcast signals or broadcast-related information from an external broadcast management system via a broadcast channel. In an exemplary embodiment, the communication component 816 further includes a near field communication (NFC) module to facilitate short-range communication. For example, an NFC module may be implemented based on a radio frequency identification (RFID) technology, an infrared data association (IRDA) technology, an ultra-wideband (UWB) technology, a Bluetooth (BT) technology and other technologies.

In an exemplary embodiment, the apparatus 800 may be implemented by one or more application specific integrated circuits(ASICs), digital signal processors (DSPs), digital signal processing devices (DSPDs), programmable logic devices (PLDs), field programmable gate arrays (FPGAs), controllers, microcontrollers, microprocessors or other electronics components, which is configured to perform the above methods.

In an exemplary embodiment, a non-transitory computer readable storage medium is further provided which includes instructions, such as the memory 804 including instructions. The instructions may be executed by the processor 820 of the apparatus 800 to perform the above methods. For example, the non-transitory computer readable storage medium may be a ROM, a RAM, a CD-ROM, a magnetic tape, a floppy disk, an optical data storage device, etc.

A non-transitory computer readable storage medium is provided. When the instruction in the storage medium is performed by a processor of a playing apparatus, the playing apparatus may perform a method for processing hybrid playing of multi-type multimedia data, and the method includes: receiving a return instruction; determining whether a current address is a homepage address of the playing apparatus; in response to the current address being the homepage address, obtaining state switching information of a broadcast TV video and a video on demand (Vod) played by the playing apparatus; determining whether the obtained state switching information meets a preset condition; and in response to the state switching information meeting the preset condition, cleaning up residual data of playing the Vod.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for processing hybrid playing of multi-type multimedia data, applied to a playing apparatus, wherein the playing apparatus is capable of playing a broadcast TV video and a video on demand (Vod), the method comprising:
   receiving a return instruction;
   determining whether a current address is a homepage address of the playing apparatus;
   in response to the current address being the homepage address, obtaining state switching information of playing broadcast TV video and Vod by the playing apparatus;
   determining whether the obtained state switching information meets a preset condition; and
   in response to the state switching information meeting the preset condition, cleaning up residual data of playing the Vod;
   wherein
   obtaining the state switching information comprises:
   obtaining a playing state switching record of the playing apparatus;
   and wherein determining whether the obtained state switching information meets the preset condition comprises:
   determining whether the playing state switching record obtained before receiving the return instruction is to exit the Vod after opening the Vod; and
   in response to the playing state switching record being to exit the Vod after opening the Vod, confirming that the state switching information meets the preset condition.

2. The method of claim 1, wherein determining whether the obtained state switching information meets the preset condition further comprises:
   determining whether the playing state switching record, obtained after opening the Vod and before exiting the Vod, is closing the broadcast TV video after opening the broadcast TV video; and
   in response to the playing state switching record obtained after opening the Vod and before exiting the Vod being closing the broadcast TV video after opening the broadcast TV video, confirming that the state switching information meets the preset condition.

3. The method of claim 1, further comprising:
   playing the broadcast TV video after cleaning up the residual data.

4. The method of claim 1, wherein the playing apparatus is a hybrid broadcast broadband TV (HbbTV), and wherein receiving the return instruction comprises:
   receiving a trigger message of an Exit key or a Back key on a controller of the HbbTV.

5. The method of claim 4, wherein cleaning up the residual data of playing the Vod comprises:
   calling an engine of a browser playing the Vod to clean up a residual HTML page.

6. A playing apparatus for hybrid playing of multi-type multimedia data, comprising:
   a processor;
   a memory configured to store instructions executable by the processor;
   wherein the processor is configured to:
   receive a return instruction;
   determine whether a current address is a homepage address of the playing apparatus;

in response to the current address being the homepage address, obtain state switching information of playing a broadcast TV video and a video on demand (Vod) by the playing apparatus;

determine whether the obtained state switching information meets a preset condition; and clean up the residual data of the Vod in response to the state switching information meeting the preset condition;

wherein, in response to obtaining the state switching information, the processor is configured to:

obtain a playing state switching record of the playing apparatus;

in response to determining whether the obtained state switching information meets the preset condition, the processor is configured to:

determine whether the playing state switching record, obtained before receiving the return instruction, is to exit the Vod after opening the Vod; and in response to determining that the playing state switching record obtained before receiving the return instruction is to exit the Vod after opening the Vod, determine that the state switching information meets the preset condition.

7. The playing apparatus of claim 6, wherein in response to determining whether the obtained state switching information meets the preset condition, the processor is further configured to:

determine whether the playing state switching record, obtained after opening the Vod and before exiting the Vod, is closing the broadcast TV video after opening the broadcast TV video; and in response to determining that the playing state switching record, obtained after opening the Vod and before exiting the Vod, is closing the broadcast TV video after opening the broadcast TV video, determine that the state switching information meets the preset condition.

8. The playing apparatus of claim 6, the processor is further configured to:

play the broadcast TV video after cleaning up the residual data.

9. The playing apparatus of claim 6, wherein the playing apparatus is a hybrid broadcast broadband TV (HbbTV), and in response to receiving the return instruction, the processor is configured to:

receive a trigger message of an Exit key or a Back key on a controller of the HbbTV.

10. The playing apparatus of claim 9, wherein in response to cleaning up the residual data of playing the Vod, the processor is configured to:

call an engine of a browser playing the Vod to clean up a residual HTML page.

11. A non-transitory computer readable storage medium, wherein, when instructions in the storage medium is executed by a processor of a playing apparatus, the playing apparatus is caused to perform a method for processing hybrid playing of multi-type multimedia data, the method comprising:

receiving a return instruction;

determining whether a current address is a homepage address of the playing apparatus;

in response to the current address being the homepage address, obtaining state switching information of playing the broadcast TV video and the Vod by the playing apparatus;

determining whether the obtained state switching information meets a preset condition; and in response to the state switching information meeting the preset condition, cleaning up residual data of playing the Vod;

wherein obtaining the state switching information comprises:

obtaining a playing state switching record of the playing apparatus;

and wherein determining whether the obtained state switching information meets the preset condition comprises:

determining whether the playing state switching record obtained before receiving the return instruction is to exit the Vod after opening the Vod; and in response to the playing state switching record obtained before receiving the return instruction is to exit the Vod after opening the Vod, determine that the state switching information meets the preset condition.

12. The storage medium of claim 11, wherein determining whether the obtained state switching information meets the preset condition further comprises:

determining whether the playing state switching record obtained after opening the Vod and before exiting the Vod is closing the broadcast TV video after opening the broadcast TV video; and in response to the playing state switching record obtained after opening the Vod and before exiting the Vod being closing the broadcast TV video after opening the broadcast TV video, determine that the state switching information meets the preset condition.

13. The storage medium of claim 11, wherein the method further comprises:

playing the broadcast TV video after cleaning up the residual data.

14. The storage medium of claim 11, wherein, the playing apparatus is a hybrid broadcast broadband TV (HbbTV), and receiving the return instruction comprises:

receiving a trigger message of an Exit key or a Back key on a controller of the HbbTV.

15. The storage medium of claim 14, wherein cleaning up the residual data of playing the Vod comprises:

calling an engine of a browser playing the Vod to clean up a residual HTML page.

* * * * *